United States Patent
Yoon et al.

(10) Patent No.: US 12,136,695 B2
(45) Date of Patent: Nov. 5, 2024

(54) CYLINDRICAL SECONDARY BATTERY AND MANUFACTURING METHOD THEREOF

(71) Applicant: LG Energy Solution, Ltd., Seoul (KR)

(72) Inventors: Sung Pil Yoon, Daejeon (KR); Dong Myung Kim, Daejeon (KR); Joo Hwan Sung, Daejeon (KR)

(73) Assignee: LG Energy Solution, Ltd., Seoul (KR)

(*) Notice: Subject to any disclaimer, the term of this patent is extended or adjusted under 35 U.S.C. 154(b) by 631 days.

(21) Appl. No.: 17/312,686

(22) PCT Filed: Jan. 30, 2020

(86) PCT No.: PCT/KR2020/001433
§ 371 (c)(1),
(2) Date: Jun. 10, 2021

(87) PCT Pub. No.: WO2020/159256
PCT Pub. Date: Aug. 6, 2020

(65) Prior Publication Data
US 2022/0069334 A1 Mar. 3, 2022

(30) Foreign Application Priority Data
Jan. 30, 2019 (KR) .................. 10-2019-0012233

(51) Int. Cl.
*H01M 10/04* (2006.01)
*H01M 50/107* (2021.01)
(Continued)

(52) U.S. Cl.
CPC ............ *H01M 10/0422* (2013.01); *H01M 10/0431* (2013.01); *H01M 50/107* (2021.01);
(Continued)

(58) Field of Classification Search
CPC .......... H01M 10/0422; H01M 50/179; H01M 10/0431; H01M 50/107; H01M 50/538; H01M 50/533
(Continued)

(56) References Cited

U.S. PATENT DOCUMENTS

| | | | |
|---|---|---|---|
| 2006/0240319 A1* | 10/2006 | Chun | H01M 10/0431 429/161 |
| 2007/0154789 A1 | 7/2007 | Chang et al. | |
| 2007/0224494 A1 | 9/2007 | Kim | |
| 2009/0004559 A1 | 1/2009 | Gardner et al. | |

(Continued)

FOREIGN PATENT DOCUMENTS

| CN | 102177603 A | 9/2011 |
|---|---|---|
| CN | 204333097 U | 5/2015 |

(Continued)

OTHER PUBLICATIONS

Extended European Search Report for EP Application No. 20747786.0 dated Dec. 6, 2021, 2 pgs.

(Continued)

*Primary Examiner* — James M Erwin
*Assistant Examiner* — John S Medley
(74) *Attorney, Agent, or Firm* — Lerner David LLP

(57) ABSTRACT

A cylindrical secondary battery includes an electrode assembly having a positive electrode/separator/negative electrode structure positioned in a cylindrical battery can. The cylindrical secondary battery comprises: a first insulating layer mounted at the upper end of the electrode assembly and having a first through hole through which the electrode tab penetrates, and a second insulating layer mounted at the upper end of the first insulating layer and having a second through hole formed to align with a central axis of the electrode assembly. A method of manufacturing the cylindrical secondary battery is also provided.

8 Claims, 4 Drawing Sheets

(51) Int. Cl.
*H01M 50/179* (2021.01)
*H01M 50/533* (2021.01)
*H01M 50/538* (2021.01)

(52) U.S. Cl.
CPC ....... *H01M 50/179* (2021.01); *H01M 50/533* (2021.01); *H01M 50/538* (2021.01)

(58) Field of Classification Search
USPC .......................................................... 429/163
See application file for complete search history.

(56) References Cited

U.S. PATENT DOCUMENTS

| | | | |
|---|---|---|---|
| 2009/0029240 | A1 | 1/2009 | Gardner et al. |
| 2010/0216013 | A1 | 8/2010 | Kim |
| 2011/0281144 | A1 | 11/2011 | Yoon et al. |
| 2017/0346064 | A1 | 11/2017 | Fukuoka et al. |
| 2018/0130994 | A1 | 5/2018 | Yamaguchi et al. |
| 2020/0044226 | A1 | 2/2020 | Fukuoka et al. |
| 2020/0176750 | A1* | 6/2020 | Funami ................ H01M 50/152 |
| 2021/0203044 | A1* | 7/2021 | Jeong ................ H01M 50/533 |

FOREIGN PATENT DOCUMENTS

| | | |
|---|---|---|
| CN | 205828514 U | 12/2016 |
| CN | 107534122 A | 1/2018 |
| CN | 108054331 A | 5/2018 |
| CN | 207459056 U | 6/2018 |
| JP | H10340737 A | 12/1998 |
| JP | 2001185118 A * | 7/2001 ............ H01M 10/05 |
| JP | 2003346894 A | 12/2003 |
| JP | 2010534916 A | 11/2010 |
| KR | 20040092531 A | 11/2004 |
| KR | 20070071244 A | 7/2007 |
| KR | 2007-0096650 A | 10/2007 |
| KR | 20100058501 A | 6/2010 |
| KR | 20100097592 A | 9/2010 |
| KR | 20110082908 A | 7/2011 |
| KR | 20160137218 A | 11/2016 |
| WO | 2018180828 A1 | 10/2018 |

OTHER PUBLICATIONS

Search Report dated May 30, 2023 from Office Action for Chinese Application No. 202080011781 issued Jun. 1, 2023. 3 pgs. (see p. 1-2, categorizing the cited references).

International Search Report for Application No. PCT/KR2020/001433, mailing May 7, 2020, 3 pages.

Search Report dated Jul. 1, 2024 from Office Action for Chinese Application No. 202080011781.8 issued Jul. 3, 2024. 2 pgs. (see p. 1, categorizing the cited references).

* cited by examiner

【FIG. 1】
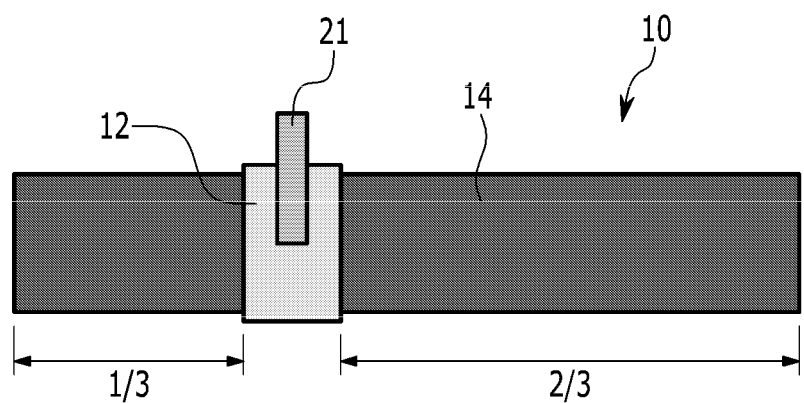
【FIG. 2】
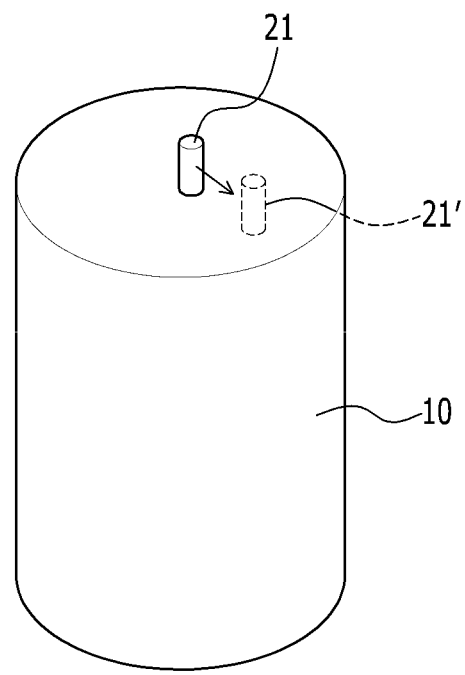

[FIG. 3]
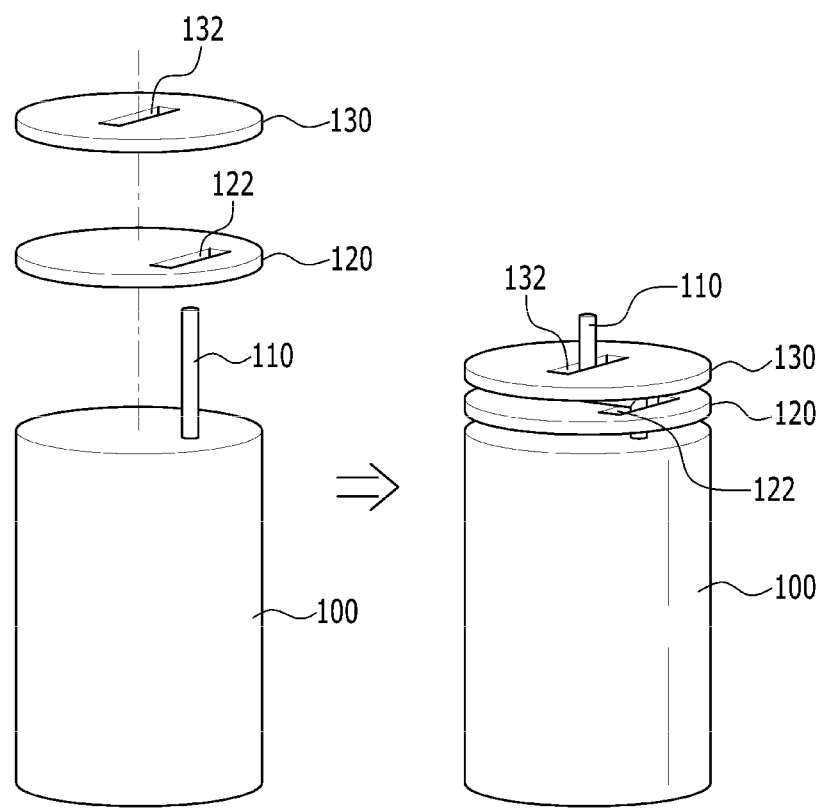

【FIG. 4】
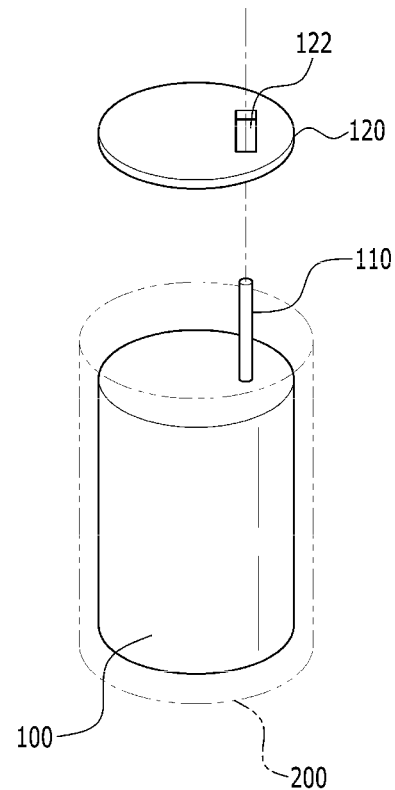
【FIG. 5】
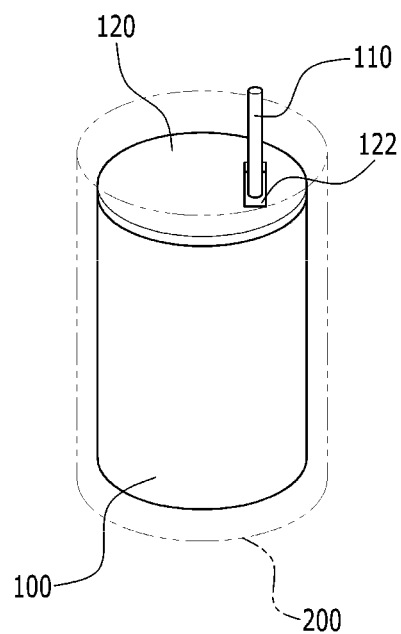

【FIG. 6】
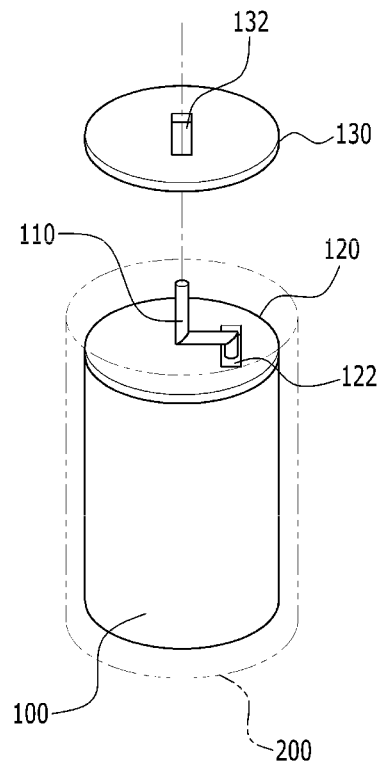
【FIG. 7】
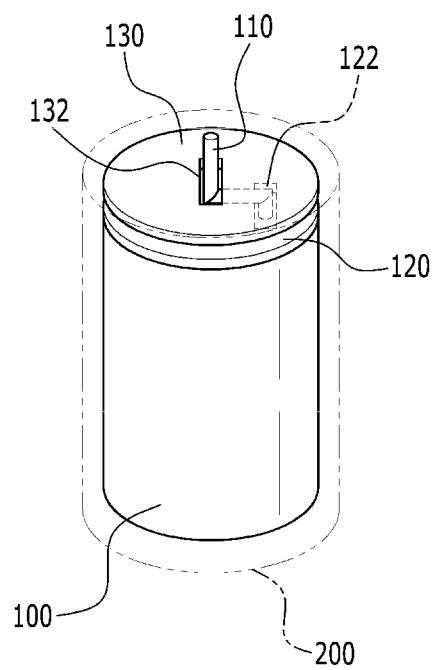

CYLINDRICAL SECONDARY BATTERY AND MANUFACTURING METHOD THEREOF

CROSS-REFERENCE TO RELATED APPLICATIONS

This application is a national phase entry under 35 U.S.C. § 371 of International Application No. PCT/KR2020/001433 filed Jan. 30, 2020, which claims priority from Korean Patent Application No. 10-2019-0012233 filed on Jan. 30, 2019 the disclosures of which are incorporated herein by reference in their entirety.

TECHNICAL FIELD

The present disclosure relates to a cylindrical secondary battery and a method for manufacturing the same, and more particularly, to a cylindrical secondary battery for aligning a position of electrode tab, and a method for manufacturing the same.

BACKGROUND ART

In modern society, as portable devices such as a mobile phone, a notebook computer, a camcorder and a digital camera have become daily used, the development of technologies in the fields related to mobile devices as described above has been activated, and there is an increasing need to develop secondary batteries used in the portable devices.

A secondary battery includes an electrode assembly composed of a positive electrode, a separator and a negative electrode, and an outer case that seals the electrode assembly with an electrolyte. Such a secondary battery may be classified into a cylindrical secondary battery, a prismatic secondary battery and a pouch-type secondary battery depending on their structural differences.

The cylindrical secondary battery may include an electrode assembly composed of a positive electrode, a separator and a negative electrode, and a can that accommodates the electrode assembly and has an opening at the upper end, and a cap assembly that covers the upper end of the can. In general, in the electrode assembly, the positive electrode is connected to a positive electrode tab wherein the positive electrode tab can be welded to the cap assembly at the upper end of the opening, and the negative electrode is connected to a negative electrode tab wherein the negative electrode tab can be welded to the bottom surface of the can.

FIG. 1 is a plan view of the electrode assembly before winding in order to explain the position of the electrode tab in a conventional secondary battery. FIG. 2 is a perspective view showing a structure in which the electrode assembly of FIG. 1 is wound.

As shown in FIG. 1, in a conventional secondary battery, the electrode tab 21 before winding was biased outside rather than in the center of the electrode assembly 10, and in this case, when current flows through the electrode, a resistance may vary due to the difference in current concentration. Considering this, an attempt was made to move the position of the electrode tab 21 to the center of the electrode assembly 10, but there was a problem that the processability is deteriorated in the manufacturing process of the secondary battery.

In this regard, referring to FIG. 2, the position of the electrode tab 21 resulting from winding the electrode assembly 10 of FIG. 1 is shifted to a position of the electrode tab 21' that is located on the outermost side of the jelly-roll structure, as shown by the direction of the arrow in FIG. 2, as compared with the position of the conventional electrode tab 21 of the electrode assembly 10 of FIG. 2, in which the position of the electrode tab 21 in the electrode assembly 10 of FIG. 1 is located in the center of the electrode assembly 10. Consequently, during the assembly process of the secondary battery, there were various process problems, such as interference of the beading holder in the beading process, interference of the injector holder in the injecting process, and stability problems due to tap reverse alignment, etc.

Therefore, there is a need to improve the problem that processability and output performance are deteriorated due to the position of the electrode tab formed on the electrode assembly of the secondary battery.

DETAILED DESCRIPTION OF THE INVENTION

Technical Problem

Embodiments of the present disclosure are proposed to solve the above problems of the previously proposed methods, and therefore, it is an object the present disclosure to provide a cylindrical secondary battery that can improve the processability by adjusting the position of the electrode, in an attempt to improve difficulties in the process caused by the position of the electrode tab protruding to the upper end of the electrode assembly in the manufacturing process of the conventional cylindrical secondary battery, and a method for manufacturing the same.

However, the problem to be solved by the embodiments of the present disclosure is not limited to the above-described problems, and can be variously expanded within the scope of the technical idea included in the present disclosure.

Technical Solution

According to one embodiment of the present disclosure, there is provided a cylindrical secondary battery in which an electrode assembly having a positive electrode/separator/negative electrode structure is built in a cylindrical battery can, the cylindrical secondary battery comprising: a first insulating layer mounted at the upper end of the electrode assembly and having a first through hole through which the electrode tab penetrates; and a second insulating layer mounted at the upper end of the first insulating layer and having a second through hole formed to correspond to a central position of the electrode assembly.

The electrode tab penetrating through the first through hole may be bent so as to penetrate through the second through hole.

The electrode tab penetrating through the second through hole may have an orientation which is perpendicular to the second insulating layer and is protruded from the center of the electrode assembly.

The first through hole is formed at a position other than the center of the first insulating layer, and the first through hole and the second through hole may not overlap each other.

The first through hole and the second through hole may have a straight through hole structure.

According to one embodiment of the present disclosure, there is provided a method of manufacturing a cylindrical secondary battery in which an electrode assembly having a positive electrode/separator/negative electrode structure is built in a cylindrical battery can, the method including the steps of: mounting a first insulating layer on an upper end of the electrode assembly and then allowing an electrode tab connected to the electrode assembly to protrude upward through a first through hole formed in the first insulating layer; bending the electrode tab penetrating through the first through hole; and mounting a second insulating layer on the upper end of the first insulating layer, wherein the bent electrode tab penetrates through a second through hole formed on the second insulating layer.

The electrode tab penetrating through the second through hole may have an orientation which is perpendicular to the second insulating layer and is protruded from the center of the electrode assembly.

The bending of the electrode tab may include bending at the first through hole and the second through hole, respectively.

The second through hole may be disposed at the center of the second insulating layer.

The method of manufacturing the cylindrical secondary battery may further include winding the electrode assembly into a jelly-roll shape; and disposing the wound electrode assembly in the inside of a battery can.

Effects of the Invention

According to embodiments of the present disclosure, the electrode tab portion connected to the electrode maintains a position for high output, and simultaneously, by folding the electrode tabs using a plurality of insulating layers, the position of the electrode tab portion protruding to the upper end of the electrode assembly can be located close to the center of the electrode assembly, thereby increasing the assembly processability of the secondary battery.

BRIEF DESCRIPTION OF THE DRAWINGS

FIG. 1 is a plan view of the electrode assembly before winding in order to explain the position of the electrode tab in a conventional secondary battery.

FIG. 2 is a perspective view showing a structure in which the electrode assembly of FIG. 1 is rolled.

FIG. 3 is a view showing a cylindrical secondary battery according to one embodiment of the present disclosure.

FIGS. 4 to 7 are perspective views showing methods of manufacturing cylindrical secondary batteries according to other embodiments of the present disclosure.

DETAILED DESCRIPTION OF THE EMBODIMENTS

Hereinafter, various embodiments of the present disclosure will be described in detail with reference to the accompanying drawings so that those skilled in the art can easily implement them. The present disclosure may be modified in various different ways, and is not limited to the embodiments set forth herein.

Parts that are irrelevant to the description will be omitted to clearly describe the present disclosure, and like reference numerals designate like elements throughout the specification.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the specification, when a part is referred to as "including" a certain component, it means that it can further include other components, without excluding the other components, unless otherwise stated.

FIG. 3 is a view showing a cylindrical secondary battery according to one embodiment of the present disclosure.

Referring to FIG. 3, a cylindrical secondary battery according to one embodiment of the present disclosure includes an electrode assembly 100, an electrode tab 110 protruding from the electrode assembly 100, a first insulating layer 120 in which a first through hole 122, through which the electric tab 110 penetrates, is formed, and a second insulating layer 130 in which a second through hole 132 is formed.

The electrode assembly 100 is formed into a positive electrode/separator/negative electrode structure, and such electrode assembly 100 may be built in a cylindrical battery can. The first insulating layer 120 and the second insulating layer 130 are mounted on the upper end of the electrode assembly 100, and the electrode tab 110 penetrates through the first through hole 122 followed by the second through hole 132. At this time, according to this embodiment, the first through hole 122 and the second through hole 132 are formed at different positions within the first insulating layer 120 and the second insulating layer 130, respectively. The second through hole 132 may be formed closer to the center of the electrode assembly 100 than the first through hole 122. Here, the center of the electrode assembly 100 may refer to the center of a circle that appears when the electrode assembly 100 is cut in the horizontal direction, as shown in FIG. 2.

The electrode tab 110 penetrating through the first through hole 122 may be bent to penetrate through the second through hole 132, and the electrode tab 110 penetrating through the second through hole 132 may have a shape which is disposed perpendicular to the second insulating layer 130 and is protruded from the center of the electrode assembly 100.

The shapes of the first through hole and the second through hole may have a straight through hole structure, but these shapes may be variously modified.

The first through hole 122 is formed at any position other than the center of the first insulating layer 122, and the first through hole 122 and the second through hole 132 may be formed so as not to overlap each other in the vertical direction. And, the shapes of the first through hole 122 and the second through hole 132 are not limited to those illustrated in FIG. 3, and in other embodiments, the first through hole 122 and the second through hole 132 may be an ellipse-shaped hole having a size that the electrode tab 110 can penetrate through.

The first insulating layer 120 is located at the upper end of the electrode assembly 100 in order to prevent a short circuit due to contact between the upper end of the electrode assembly 100 and the electrode tab 110 in the process of bending the electrode tab 110 as shown in FIG. 3, and may be formed of an insulating material. In addition, the second insulating layer 130, which may be formed of an insulating material, is to be located in the center of the electrode assembly 100 by bending the electrode tab 110 penetrating through the first through hole 122 so that the electrode tab 110 is disposed in the center of the second insulating layer 130.

The above-mentioned electrode tab 110 may be a positive electrode tab.

In the following, a method of manufacturing the cylindrical secondary battery according to the present embodiment will be described.

The method of manufacturing a secondary battery according to the present embodiment is a method of manufacturing a cylindrical secondary battery in which an electrode assembly having a positive electrode/separator/negative electrode structure is built in a cylindrical battery can, the method including the steps of: winding the electrode assembly into a jelly-roll shape; mounting a first insulating layer on an upper end of the electrode assembly and then allowing an electrode tab to protrude upward through a first through hole formed in the first insulating layer; bending twice the electrode tab penetrating through the first through hole so that the electrode tab is oriented perpendicular to the first insulating layer; and mounting a second insulating layer on an upper end of the first insulating layer such that the bent electrode tab penetrates through a second through hole formed on the second insulating layer.

After the step of winding the electrode assembly into a jelly-roll shape, the method may further include disposing the electrode assembly wound into the jelly-roll shape inside the battery can.

In the following, the method of manufacturing a cylindrical secondary battery according to the present embodiment will be described in more detail with reference to FIGS. 4 to 7. FIGS. 4 to 7 are perspective views showing methods of manufacturing cylindrical secondary batteries according to other embodiments of the present disclosure.

As shown in FIG. 4, the electrode tab 110 protrudes at the upper end of the electrode assembly 100 disposed inside the battery can 200, wherein it can be seen that the position of the electrode tab 110 is biased outside rather than in the center of the electrode assembly 100 in a similar manner to the conventional secondary battery. Although not shown, the electrode assembly 100 according to the present embodiment may be in a jelly-roll shape.

FIG. 5 is a view showing a shape in which the first insulating layer 120 is mounted at the upper end of the electrode assembly 100 of FIG. 4. The first through hole 122 is formed at a position offset from the center of the first insulating layer 120, that is, at a position other than the center of the electrode assembly 100. This allows the first through hole 122 to be biased outside to allow the penetration therethrough of the protruding electrode tab 110.

FIG. 6 is a view showing a bent shape of the electrode tab 110 which has passed through the first through hole 122. This is for locating the remaining portion of the electrode tab 110 in the center of the electrode assembly 100, wherein the electrode tab 110 may be vertically bent twice so as to be disposed to protrude vertically from the center of the electrode assembly 100.

Next, FIG. 7 is a view in which the second insulating layer 130 is mounted at the upper end of the first insulating layer 120, wherein the bent electrode tab 110 penetrates through the second through hole 132 of the second insulating layer 130. The second through hole 132 is formed in a portion corresponding to a central position of the electrode assembly 100, and finally, the electrode tab 110 penetrating through the second through hole 132 has an orientation which is perpendicular to the second insulating layer 130 and is protruded from the center of the electrode assembly 100.

As described above, the technical significance of the present disclosure resides in that by locating the positive electrode tab at the center of the electrode assembly, interferences from the beading holder, injector holder, etc. are eliminated in the assembly process of the secondary battery, whereby the processability is improved, and that by mounting two insulators at the upper end of the electrode assembly, the insulation property is increased to prevent phenomena such as short circuit, thereby improving stability. If the positive electrode tab is not located at the center of the electrode assembly before winding but is biased on either side, resistance may vary due to a difference in current concentration when current flows through the electrode. Therefore, when the positive electrode tab is located at the center of the electrode assembly as in the embodiment of the present disclosure, the difference in current concentration is reduced than before, resulting in a decrease in resistance and thus improvement in output characteristics.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

The invention claimed is:

1. A cylindrical secondary battery in which an electrode assembly having a positive electrode/separator/negative electrode structure is positioned in a cylindrical battery can, the cylindrical secondary battery comprising:
   a first insulating layer positioned at an upper end of the electrode assembly and having a first through hole through which an electrode tab extends; and
   a second insulating layer mounted at an upper end of the first insulating layer and having a second through hole positioned to align with a central axis of the electrode assembly,
   wherein the electrode assembly has a length dimension extending from a first end of the electrode assembly to a second end of the electrode assembly, the electrode assembly being wound along the length dimension about a central axis extending perpendicular to the length dimension,
   wherein the electrode tab is located along the length dimension at a center point between the first and second ends of the electrode assembly before winding, and
   wherein the electrode tab extends through the first through hole and bends so as to extend through the second through hole, the second hole being located along the central axis.

2. The cylindrical secondary battery of claim 1, wherein a portion of the electrode tab extending through the second through hole is oriented perpendicular to the second insulating layer and extends along the central axis.

3. The cylindrical secondary battery of claim 1, wherein the first through hole is located at a position other than a center of the first insulating layer, and the first through hole and the second through hole do not overlap with one another.

4. The cylindrical secondary battery of claim 1, wherein the first through hole and the second through hole each have an elongated shape that extends along a linear major axis.

5. A method of manufacturing a cylindrical secondary battery in which an electrode assembly having a positive electrode/separator/negative electrode structure is positioned in a cylindrical battery can, the method including the steps of:
- winding the electrode assembly along a length dimension of the electrode assembly into a wound configuration about a central axis extending perpendicular to the length dimension, wherein the length dimension of the electrode assembly extends from a first end of the electrode assembly to a second end to the electrode assembly;
- inserting the wound configuration of the electrode assembly inside the cylindrical battery can;
- mounting a first insulating layer on an upper end of the electrode assembly and allowing an electrode tab connected to the electrode assembly to protrude upward through a first through hole defined in the first insulating layer;
- bending the electrode tab penetrating through the first through hole; and
- mounting a second insulating layer at an upper end of the first insulating layer, wherein the bent electrode tab penetrates through a second through hole defined in the second insulating layer, and wherein the electrode tab is connected to the electrode assembly at a center of the length dimension of the electrode assembly before winding.

6. The method of manufacturing the cylindrical secondary battery of claim 5, wherein the electrode tab penetrating through the second through hole is oriented perpendicular to the second insulating layer and extends along the central axis.

7. The method of manufacturing the cylindrical secondary battery of claim 5, wherein the bending of the electrode tab includes bending a first time at the first through hole and bending a second time at the second through hole.

8. The method of manufacturing the cylindrical secondary battery of claim 5, wherein the second through hole is disposed at a center of the second insulating layer.

* * * * *